(12) United States Patent
Klasing et al.

(10) Patent No.: US 10,125,781 B2
(45) Date of Patent: Nov. 13, 2018

(54) SYSTEMS AND METHODS FOR A COMPRESSOR DIFFUSION SLOT

(71) Applicant: General Electric Company, Schenectady, NY (US)

(72) Inventors: Kevin Samuel Klasing, Springboro, OH (US); Robert Proctor, Mason, OH (US); Jonathan Russell Ratzlaff, Loveland, OH (US); Thomas Matthew Doerflein, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 14/984,473

(22) Filed: Dec. 30, 2015

(65) Prior Publication Data

US 2017/0191484 A1    Jul. 6, 2017

(51) Int. Cl.
*F02C 6/08*  (2006.01)
*F04D 27/00*  (2006.01)
(Continued)

(52) U.S. Cl.
CPC ............. *F04D 27/009* (2013.01); *F01D 9/06* (2013.01); *F02C 9/18* (2013.01); *F04D 27/023* (2013.01);
(Continued)

(58) Field of Classification Search
CPC .. F02C 6/08; F02C 9/18; F01D 17/105; F04D 27/009; F04D 27/023; F04D 27/0215; F04D 29/542; F04D 29/545; F04D 29/547
See application file for complete search history.

(56) References Cited

U.S. PATENT DOCUMENTS

| | | | |
|---|---|---|---|
| 3,142,438 A | | 7/1964 | McKenzie |
| 3,945,759 A | * | 3/1976 | Bobo .................. F04D 27/0215 415/145 |

(Continued)

FOREIGN PATENT DOCUMENTS

CN       101418724 A       4/2009

OTHER PUBLICATIONS

Extended European Search Report and Written Opinion issued in connection with corresponding EP Application No. 16206166.7 dated May 31, 2017.
(Continued)

*Primary Examiner* — Jason Shanske
*Assistant Examiner* — Behnoush Haghighian
(74) *Attorney, Agent, or Firm* — General Electric Company; Brian Overbeck

(57) ABSTRACT

A compressor for a gas turbine engine includes a stator and a rotor. The stator includes first and second stator vanes attached to first and second vane platforms, respectively. The rotor includes a plurality of rotor blades that rotate with respect to the stator. An inner stator casing supports the first and second vane platforms and encloses the stator and the rotor. An outer stator casing encloses the inner stator casing, and a bleed cavity is disposed therebetween. At least one diffuser is disposed between the first vane platform and the second vane platform, and is configured to allow air communication between the inner stator casing and the bleed cavity. An exit opening of the diffuser is disposed within the bleed cavity at a location separate from the inner stator casing and the outer stator casing.

14 Claims, 2 Drawing Sheets

(51) Int. Cl.
F04D 29/32 (2006.01)
F04D 29/52 (2006.01)
F01D 9/06 (2006.01)
F02C 9/18 (2006.01)
F04D 27/02 (2006.01)
F01D 17/10 (2006.01)
F04D 29/54 (2006.01)

(52) U.S. Cl.
CPC ......... F04D 29/321 (2013.01); F04D 29/522 (2013.01); F04D 29/542 (2013.01); F04D 29/545 (2013.01); F01D 17/105 (2013.01); F02C 6/08 (2013.01); F04D 27/0215 (2013.01); F04D 29/547 (2013.01); F05D 2220/32 (2013.01); F05D 2230/60 (2013.01)

(56) References Cited

U.S. PATENT DOCUMENTS

| | | | |
|---|---|---|---|
| 5,155,993 A | | 10/1992 | Baughman et al. |
| 5,209,633 A | | 5/1993 | McGreehan et al. |
| 5,231,825 A | * | 8/1993 | Baughman .......... F04D 27/0215 60/204 |
| 6,109,868 A | | 8/2000 | Bulman et al. |
| 6,325,595 B1 | | 12/2001 | Breeze-Stringfellow et al. |
| 6,438,941 B1 | * | 8/2002 | Elliott .................. F01D 17/105 60/226.1 |
| 6,622,475 B2 | | 9/2003 | Brault et al. |
| 6,782,702 B2 | * | 8/2004 | Charon .................. F02C 6/08 60/785 |
| 8,935,926 B2 | | 1/2015 | Wagner et al. |
| 9,103,281 B2 | | 8/2015 | King et al. |

OTHER PUBLICATIONS

Machine Translation and First Office Action and Search issued in connection with corresponding CN Application No. 201611243691.3 dated Jan. 19, 2018.

* cited by examiner

SYSTEMS AND METHODS FOR A COMPRESSOR DIFFUSION SLOT

BACKGROUND

The field of the disclosure relates generally to gas turbine engines and, more particularly, to the extraction of air from a compressor of a gas turbine engine.

Gas turbine engines typically include a multistage axial flow high pressure compressor which supplies high pressure air to a combustor. The compressor includes multiple stages. Each stage is composed of a stationary component referred to as a stator and a rotational component, which adds work to the system referred to as a rotor. A portion of compressed interstage air may be extracted for turbine section cooling, airframe pressurization, anti-icing, and other uses. Because work is added to air as it flows through each stage of the compressor, typically from the high-speed rotation of numerous rotor blades, it is desirable to extract, or bleed, air from the compressor after a number of stages.

Small quantities of air can be extracted through bleed slot openings within compressor casing systems. Some known bleed slots include assemblies of two cantilevered cases joined together to create a segmented annular ring having multiple bleed slot openings. The joints between these two cases, however, create leak paths for airflow through the bleed slot openings, and thereby a loss in the pressure that can be recovered downstream in a bleed cavity. Additionally, the separate pieces of the known bleed slot assemblies are known to move with respect to one another during operation of the gas turbine engine, which typically sees high temperatures and pressures in a complex and active thermodynamic environment. Such movement creates additional leak paths and pressure loss into the bleed cavity, which is undesirable. Furthermore, the shape of some known bleed slots create dead zones along their lengths where air flows significantly more slowly through the bleed slots, thereby creating further undesirable pressure losses.

BRIEF DESCRIPTION

In one embodiment, a compressor for a gas turbine engine includes a stator and a rotor. The stator includes a first stator vane and a second stator vane. The first stator vane is attached to a first vane platform and the second stator vane is attached to a second vane platform. The rotor includes a plurality of rotor blades configured to rotate with respect to the stator vanes. The compressor further includes an inner stator casing supporting the first vane platform and the second vane platform, and an outer stator casing enclosing the inner stator casing. The inner stator casing encloses the stator and the rotor therein. A bleed cavity is disposed between the inner stator casing and the outer stator casing, and at least one diffuser is disposed between the first vane platform and the second vane platform. The diffuser includes an entrance opening, an exit opening, and an air passageway between the entrance opening and the exit opening. The diffuser is configured to allow air communication between an interior of the inner stator casing and the bleed cavity, and the exit opening is disposed within the bleed cavity at a location separate from the inner stator casing and the outer stator casing.

In another embodiment, a method for fabricating a multistage compressor for a gas turbine engine including a plurality of stator vanes attached to a plurality of vane platforms connected to a stator casing includes the steps of configuring the stator casing into an inner portion and an outer portion, forming at least one airflow slot into a monolithic annular ring, the at least one airflow slot extending radially from an inner circumference of the monolithic annular ring to an outer circumference of the monolithic annular ring, and disposing the monolithic annular ring between two adjacent ones of the plurality of vane platforms such that the inner circumference of the monolithic annular substantially aligns in the axial direction with a longitudinal direction of the plurality of vane platforms.

In yet another embodiment, a diffuser for an aircraft engine compressor includes an annular monolithic body having an annular front wall and an annular aft wall. The annular front wall and the annular aft wall each extend radially from an inner circumference of the annular monolithic body to an outer circumference of the annular monolithic body. The annular monolithic body as a thickness between the annular front wall and the annular aft wall, and includes a plurality of smooth air passageways disposed radially in the annular monolithic body between the annular front wall and the annular aft wall. The plurality of smooth air passageways are configured to allow air communication between the inner circumference and the outer circumference of the annular monolithic body. Each of the plurality of smooth air passageways includes an inner sectional area that gradually widens from the inner circumference to the outer circumference.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 illustrates a sectional schematic view of a gas turbine engine.

FIG. 2 is a side elevation view of a multistage compressor that may be used with the gas turbine engine shown in FIG. 1.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The following detailed description illustrates embodiments of the disclosure by way of example and not by way of limitation. It is contemplated that the disclosure has general application to increasing recovered pressure from airflow into a bleed cavity of a gas turbine engine.

The following description refers to the accompanying drawings, in which, in the absence of a contrary representation, the same numbers in different drawings represent similar elements.

Figure 1:
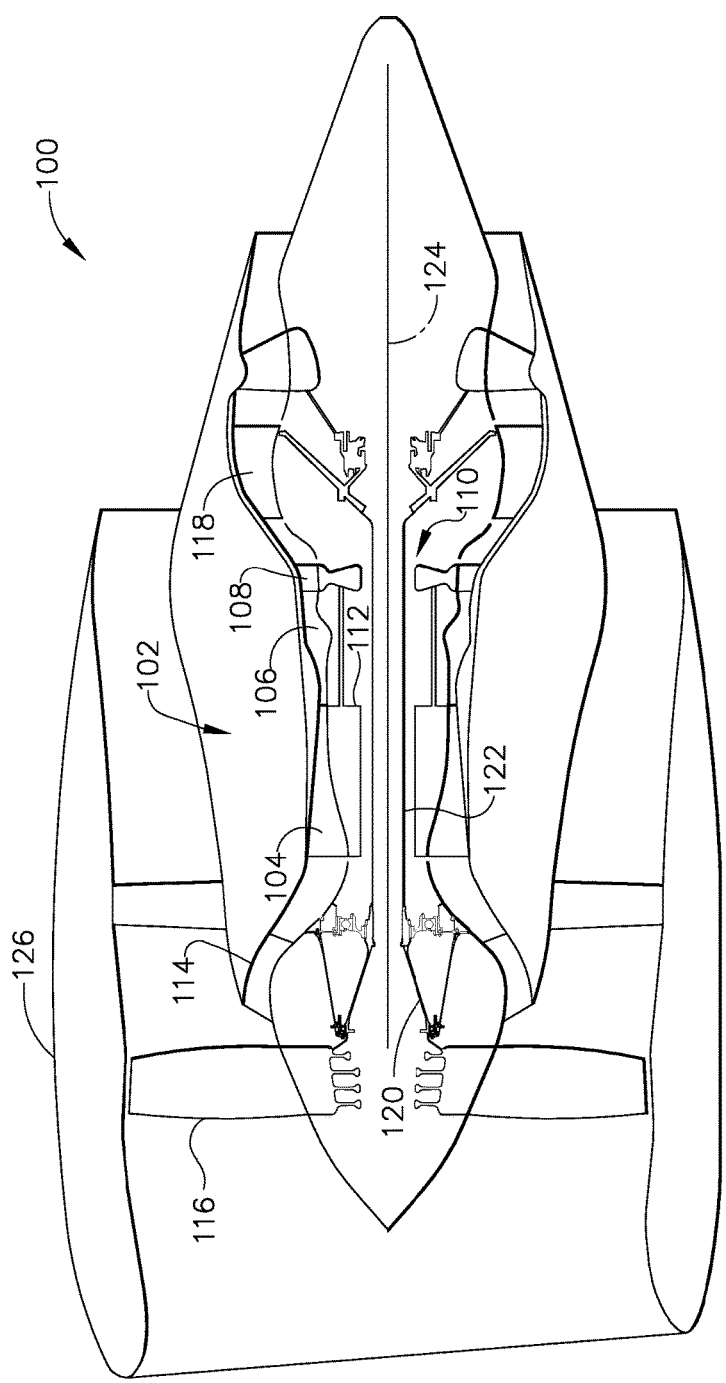
FIGS. 1-2 show example embodiments of the method and system described herein.

FIG. 1 is a schematic illustration of an exemplary gas turbine engine 100. Gas turbine engine 100 includes a gas generator or core engine 102 that includes a high pressure compressor (HPC) 104, a combustor assembly 106, and a high pressure turbine (HPT) 108 in an axial serial flow relationship on a core engine rotor 110 rotating about a core engine shaft 112. Gas turbine engine 100 also includes a low pressure compressor 114 and a fan 116, and a low pressure turbine 118 arranged in an axial flow relationship on an engine rotor 120 by power engine shaft 122.

During operation, air flows along a central axis 124, and compressed air is supplied to high pressure compressor 104. Highly compressed air is then delivered to combustor assembly 106. Exhaust gas flow from combustor assembly 106 drives turbine 108, and turbine 108 drives engine rotor 120, in addition to low pressure compressor 114 and fan 116. Gas turbine engine 100 also includes a containment case 126 for low pressure compressor 114 and fan 116.

Furthermore, additional and/or different elements not shown may be contained in, or coupled to the elements shown in FIG. 1, and/or certain illustrated elements may be absent. In some examples, the functions provided by the illustrated elements could be performed by less than the illustrated number of components or even by a single element.

Figure 2:
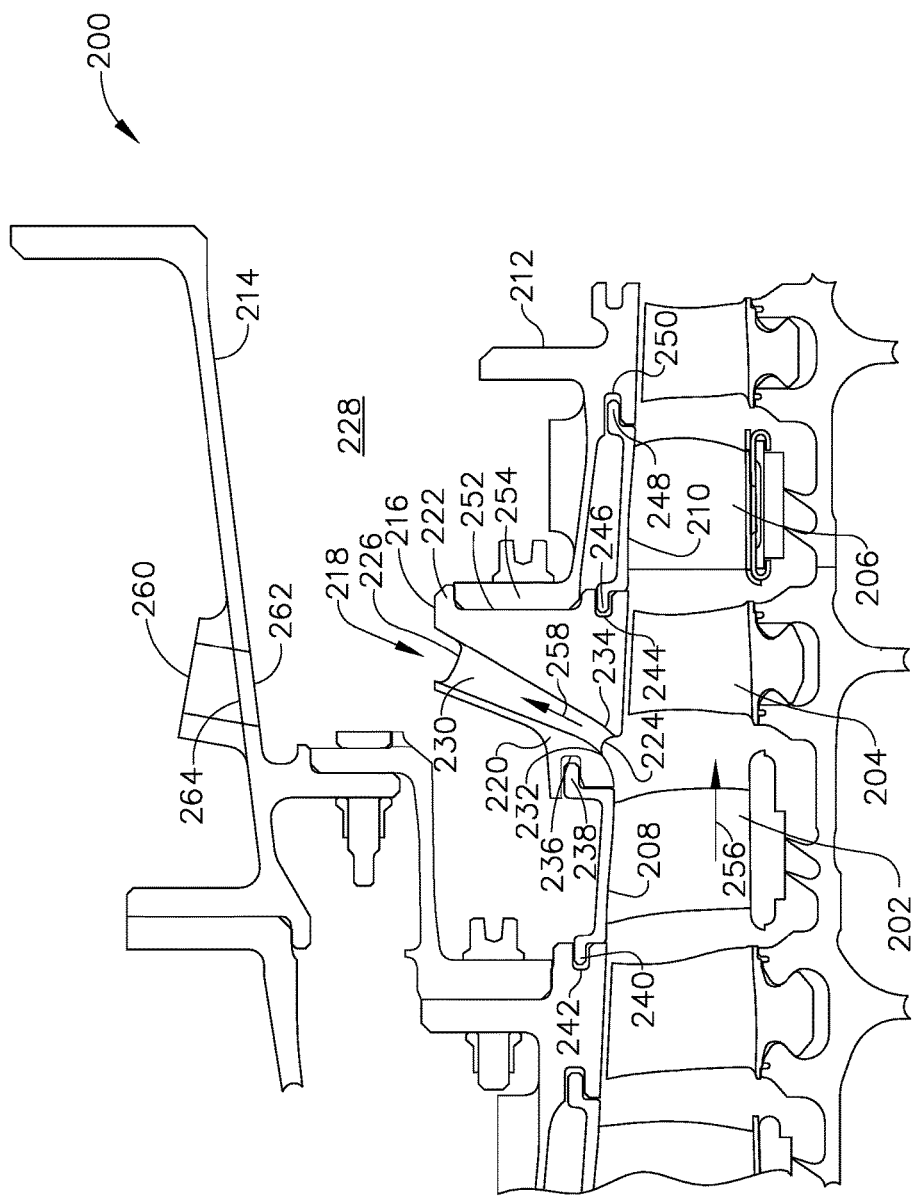

FIG. 2 is a side elevation view of a multistage compressor 200 that may be used with gas turbine engine 100 (shown in FIG. 1). Compressor 200 is a multistage open compressor system including a plurality of stationary components, typically referred to as stators, and a plurality of rotational components, typically referred to as rotors, which add work to the compressor system. During engine operation, air flows longitudinally from a forward portion to the aft portion of compressor 200. The air is compressed at each stage of compressor 200, and the compressed air is directed to an inlet of combustor 106.

Compressor 200 includes a first stator vane 202 forward of a rotor blade 204, and a second stator vane 206 aft of rotor blade 204. First stator vane 202 is fixedly attached to a first vane platform 208, and second vane platform 208 is fixedly attached to a second vane platform 210. First vane platform 208 is configured to couple with a lower stator casing 212 and second vane platform 210 is configured to couple with an upper stator casing 214 of compressor 200. In an exemplary embodiment, first vane platform 208 is fixedly attached to lower stator casing 212 and second vane platform 210 is fixedly attached to upper stator casing 214. For purposes of this description, the terms "lower" and "upper" are used for reference purposes with respect to the view shown in FIG. 2, and are not meant to be limiting. Lower stator casing 212, for example, can be considered an "inner casing" with respect to upper stator casing 214, which can be considered an "outer casing" of an overall annular design of compressor 200.

An annular ring, or diffuser, 216 is disposed between first and second stator vanes 202, 206, and includes an airflow slot, or throat, 218 disposed between a ring front portion 220 and a ring aft portion 222. Airflow slot 218 includes a flow path entrance 224, and a flow path exit 226 in communication with bleed cavity 228. An air passageway 230 is formed between flow path entrance 224 and flow path exit 226.

Airflow slot 218 smoothly curves from flow path entrance 224 such that airflow slot 218 includes a convex shape 232 to ring front portion 220 where ring front portion 220 meets and extends away from flow path entrance 224. Similarly airflow slot 218 includes a concave shape 234 to ring aft portion 222 where ring aft portion 222 meets and extends away from flow path entrance 224. In an exemplary embodiment, airflow slot 218 includes an internal frustoconical shape where airflow slot 218 extends away from flow path entrance 224 toward flow path exit 226, such that flow path exit 226 is internally wider than flow path entrance 224.

In an exemplary embodiment, annular ring 216 includes a plurality of airflow slots 218 disposed radially and evenly distributed around annular ring 216. In an embodiment, annular ring 216 is fabricated of a single, monolithic ring, and air passageway 230 is internally smooth from flow path entrance 224 to flow path exit 226, and unbroken by joints of segmented pieces connected together. By this advantageous structure, the overall structure of annular ring 216 is more rigid, and leakage paths along air passageway 230 are eliminated. In an aspect of the embodiment, flow path entrance 224 and flow path exit 226 define inner and outer circumferences (not separately numbered) of annular ring 216.

In an exemplary embodiment, ring front portion 220 of annular ring 216 includes a front opening 236 that is configured to couple with a first end 238 of first vane platform 208. A second end 240 of first vane platform 208 opposes first end 238, and is configured to couple with an opening 242 of upper stator casing 214. Annular ring 216 further includes an aft opening 244 configured to couple with a first end 246 of second vane platform 210. A second end 248 of second vane platform 210 is configured to couple with an opening 250 of lower stator casing 212. In the exemplary embodiment, an aft wall 252 of annular ring 216 fixedly attaches to an attachment portion 254 of lower stator casing 212 within bleed cavity 228. In an exemplary embodiment, airflow slot 218 is of sufficient length such that flow path exit 226 extends into bleed cavity 228 beyond the uppermost dimensions (not numbered) of lower stator casing 212 and attachment portion 254 such that air exiting flow path exit 226 will not encounter discontinuities from lower stator casing 212 before entering bleed cavity 228.

In operation, air flows across first stator vane 202, rotor blade 204, and second stator vane 206 in a main airflow path 256. Annular ring 216 routes some of main airflow path 256 along a separate bleed airflow path 258 through air passageway 230 into bleed cavity 228. Convex shape 232 of ring front portion 220 is smoothly rounded from the location to the location where convex shape 232 meets main airflow path 256, to where air passageway 230 contains bleed airflow path 258, to minimize pressure loss as the flow of air turns nearly ninety degrees as it transitions from main airflow path 256 into bleed airflow path 258. In an exemplary operation, air can travel along main airflow path 256 at Mach 0.5, whereas air traveling along bleed airflow path 258 can be defused to travel at Mach 0.2.

In the exemplary embodiment, the interrelationship of convex shape 232 with concave shape 234 about flow path entrance 224 serves as a "scoop," to scoop bleed airflow path 258 from main airflow path 256. In the exemplary embodiment, a curvature radius of convex shape 232 is greater than a curvature radius of concave shape 234 to increase the "scoop" functionality of airflow slot 218. Because of this geometry, airflow across convex shape 232 begins to slow before bleed airflow path 258 extends deeply into air passageway 230, thereby enabling annular ring 216 to more easily and advantageously turn a greater portion of main airflow path 256 toward bleed airflow path 258.

In the exemplary embodiment, flow path entrance 224 is smoothly rounded and contoured from ring front portion 220 to ring aft portion 222 to allow the air speed to slow down after rounding convex shape 232, and to minimize dead zones in bleed airflow path 258 through air passageway 230. The curved and rounded construction of the components of compressor 200 along main airflow path 256 and bleed airflow path 258 also reduce discontinuities in airflow from one stage to another, thereby minimizing pressure loss along the respective paths.

Dead zones in bleed airflow path 258 are minimized by controlling the size of the radial opening, also known as throat area, of the vaned passageway 230. By increasing the area of passageway 230 along airflow path 258, the exemplary embodiment permits better control of air diffusion, and therefore reduced velocity, of the air through passageway 230, thereby reducing pressure losses along bleed airflow path as it merges into bleed cavity 228. Additionally, the smooth and solid unitary interior of air passageway 230 prevents leak paths and improves structural rigidity, thereby further improving pressure delivery into bleed cavity 228.

During operation, air flows through compressor 200 in a high-temperature, volatile thermal environment. Air turns rapidly by rotational components of compressor 200 (e.g., rotor blade 204), and will have a tendency to separate without structural redirection. By the advantageous geometry of the embodiments herein, air passageway 230 is capable of channeling air through annular ring 216 more consistently, without the need to add further structural vanes within the interior of air passageway 230, as are conventionally utilized to avoid loss of pressure and performance into bleed cavity 228, for example. According to the embodiments herein, recirculation bubbles are minimized that would otherwise form in a conventional bleed slot, and rotor blade 204 may be spaced more closely to first stator vane 202 and second stator vane 206, thereby allowing for a more compact overall design structure for compressor 200.

In the exemplary embodiment, for an axial compressor configuration, the flow of air turns nearly ninety degrees through annular ring 216 from main airflow path 256 to bleed airflow path 258. In an alternative embodiment, for a radial, or centrifugal, compressor configuration, air is diverted from main airflow path 256 at an angle greater than ninety degrees, and the frustoconical shape of airflow slot 218 is further rounded into a horn shape. In this alternative embodiment, annular ring need not be fixedly coupled between two adjacent stator vane platforms, e.g., first and second vane platforms 208, 210, and is instead fixedly coupled directly between adjacent portions of inner casing 212.

Referring again to FIG. 2, a piping system 260 is coupled with upper stator casing 214 at an opening 262 in upper stator casing 214. Piping system 260 allows communication between bleed cavity 228 and the high pressure turbine, e.g. high pressure turbine 108, FIG. 1, for the purpose of turbine cooling. An orifice plate 264 is disposed within piping system 260 proximate opening 262, and allows control of the amount of air pressure communicated from bleed cavity 228 to high pressure turbine 108. By increasing the available pressure realized in bleed cavity 228, air passageway 230 thereby permits the utilization of smaller orifice plates to manage the flow level to high pressure turbine 108. Air passageway 230 thus further allows for an additional increase in pressure available to high pressure turbine 108 if the additional pressure is desired for high pressure turbine applications.

In operation, air extracted from main airflow path 256 into bleed cavity 228 can be used for multiple purposes, such as turbine cooling, hot cavity purging, turbine clearance control, and aircraft pressurization. The availability of extracted air is therefore affected by the amount of air pressure initially realized in bleed cavity 228. Increased pressure realized in bleed cavity 228 advantageously allows for greater versatility particularly with respect to overall engine design and certification.

For example, where pressure in bleed cavity 228 is limited, the testing process of an engine for certification will typically require a teardown and rebuild of the engine (e.g., gas turbine engine 100, FIG. 1) for each different structural design option that is desired to be tested. This teardown/rebuild process is often necessary because the actual operation of an engine involves a significantly complex set of thermal and mechanical physics that are difficult to fully predict in the design phase of the engine. Trial and error of different designed configurations is required to verify the optimal design choices that will go into the manufactured product.

In the example where extracted air in bleed cavity 228 is used for cooling purposes, an increase in pressure bleed cavity 228 allows for a smaller structural design of orifice plate 264 to maintain the flow of air from bleed cavity 228 through piping system 260. Alternatively, in the testing/certification process of the overall engine design, orifice plate 264 can be adjustable, allowing an engine designer to change the effective size of opening 262, through which air is communicated from bleed cavity 228 into piping system 260, without having to tear down, or vertically disassemble, the entire engine between tests. The teardown/disassembly of an engine is a complex and time-consuming process, whereas a change in the opening size of an adjustable orifice plate can be made much more quickly and easily.

By increasing pressure into bleed cavity 228 by the advantageous design of compressor 200 and annular ring 216, greater control of the overall engine system can be realized. Multiple and different design change options can be implemented and tested downstream of the compressor, but using the same compressor structural design, without having to disassemble the entire engine between tests. This increased versatility in the testing and certification process can significantly improve the cost and efficiency of optimizing the engine structural design.

The foregoing detailed description illustrates embodiments of the disclosure by way of example and not by way of limitation. It is contemplated that the disclosure has general application to bleeding or extracting air between stages of a multistage compressor for various purposes. It is further contemplated that the methods and systems described herein may be incorporated into existing aircraft engine designs and structures.

It will be appreciated that the above embodiments that have been described in particular detail are merely example or possible embodiments, and that there are many other combinations, additions, or alternatives that may be included. The apparatus illustrated is not limited to the specific embodiments described herein, but rather, components of each may be utilized independently and separately from other components described herein. Each system component can also be used in combination with other system components.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressor for a gas turbine engine, the compressor including a rotor and a stator disposed within an inner stator casing and a bleed cavity disposed outside of the inner stator casing, the stator including a plurality of stator vanes fixedly coupled to the inner stator casing and the rotor including a plurality of rotor blades configured to rotate with respect to the plurality of stator vanes, said compressor comprising: at least one diffuser disposed along the inner stator casing between two adjacent stator vanes of the plurality of stator vanes, said at least one diffuser comprising: an annular ring comprising an annular ring front portion and an annular ring aft portion, said ring portions each extending radially from an inner circumference of said annular ring to an outer circumference of said annular ring and at least one air passageway extending through said annular ring from an entrance opening disposed within the inner stator casing to an exit opening disposed within the bleed cavity at a location separate from the inner stator casing to allow air communication between the rotor and the bleed cavity, said at least one air passageway bounded by a first surface of said ring front portion and a second surface of said ring aft portion, said first surface having a convex shape extending from a first vane platform into said at least one air passageway and said second surface having a concave shape at said entrance opening, said first and second surfaces cooperating to form a scoop at said entrance opening, wherein said convex shape of said first surface has a greater radius of curvature than said concave shape of said second surface and said at least one air passageway is wider at said exit opening than said entrance opening.

2. The compressor of claim 1, wherein said at least one air passageway includes a frustoconical shape near said exit opening.

3. The compressor of claim 1, wherein said annular ring comprises a circumference, and wherein said at least one air passageway comprises a plurality of air passageways evenly distributed throughout said circumference of said annular ring.

4. The compressor of claim 3, wherein said annular ring is formed as a single, monolithic ring.

5. The compressor of claim 3, wherein said annular ring further comprises a front attachment portion for fixedly coupling with a forward stator vane of the two adjacent stator vanes, and a first aft attachment portion for fixedly coupling with an aft stator vane of the two adjacent stator vanes.

6. The compressor of claim 5, wherein said annular ring further comprises a second aft attachment portion for fixedly coupling with the inner stator casing, said first aft attachment portion and said second aft attachment portion disposed between the inner stator casing and said exit opening of said annular ring.

7. The compressor of claim 1, wherein the compressor further includes an outer stator casing surrounding the inner stator casing and the bleed cavity, and wherein the compressor further includes a piping system coupled to the outer stator casing.

8. The compressor of claim 7, wherein the piping system includes an adjustable orifice plate configured to control an amount of air communication between the bleed cavity and the piping system.

9. The compressor of claim 8, wherein said adjustable orifice plate is disposed within an opening in the outer stator casing.

10. A method for fabricating a multistage compressor for a gas turbine engine including a plurality of stator vanes attached to a plurality of vane platforms connected to a stator casing, said method comprising the steps of:

configuring the stator casing into an inner portion and an outer portion;

forming at least one airflow slot into a monolithic annular ring, the at least one airflow slot extending radially from an inner circumference of the monolithic annular ring to an outer circumference of the monolithic annular ring, the at least one airflow slot being bounded by a first surface of a forward portion of the monolithic annular ring and a second surface of an aft portion of the monolithic annular ring, the first surface having a convex shape and the second surface having a concave shape near the inner circumference of the monolithic annular ring, the first and second surfaces cooperating to form a scoop near the inner circumference of the monolithic annular ring with the convex shape of the first surface having a greater radius of curvature than the concave shape of the second surface, the at least one airflow slot having a width near the outer circumference greater than a width of the at least one airflow slot near the inner circumference; and disposing the monolithic annular ring between two adjacent vane platforms of the plurality of vane platforms such that the inner circumference of the monolithic annular ring substantially aligns in the axial direction with a longitudinal direction of the plurality of vane platforms, the convex shape extending from a forward one of the adjacent vane platforms into the at least one airflow slot.

11. The method of claim 10, wherein the step of forming further comprises forming a plurality of equally-sized airflow slots radially through the monolithic annular ring in an annularly even distribution.

12. A diffuser for an aircraft engine compressor, said diffuser comprising:
an annular monolithic body having a annular front portion and an annular aft portion, said annular front portion and said annular aft portion each extending radially from an inner circumference of said annular monolithic body to an outer circumference of said annular monolithic body, said annular monolithic body having a thickness between said annular front portion and said annular aft portion; and
a plurality of air passageways disposed radially in said annular monolithic body between said annular front portion and said annular aft portion, said plurality of air passageways configured to allow air communication between said inner circumference and said outer circumference of said annular monolithic body,
wherein each of said plurality of air passageways includes an inner sectional area that gradually widens from said inner circumference to said outer circumference and is bounded by a first surface of said annular front portion and a second surface of said annular aft portion, said first surface having a convex shape extending from a forward vane platform into said air passageway and said second surface having a concave shape near said inner circumference, said first and second surfaces cooperating to form a scoop near said inner circumference, and wherein said convex shape of said first surface has a greater radius of curvature than said concave shape of said second surface.

13. The diffuser of claim 12, wherein said inner circumference is configured to align with a compressor casing that surrounds a main airflow path through said compressor.

14. The diffuser of claim 13, wherein said outer circumference is configured to terminate within a bleed cavity of said compressor at a location spaced away from said compressor casing.

* * * * *